United States Patent
Fasano

[11] 3,971,724
[45] July 27, 1976

[54] DISPLAY DEVICE BACKGROUND COMPONENT COMPOSITION AND METHOD

[76] Inventor: Ernest L. Fasano, 134 Ninth St., Piscataway, N.J. 08854

[22] Filed: Aug. 27, 1974

[21] Appl. No.: 501,062

[52] U.S. Cl. ............................. 252/63.2; 252/63.5; 106/48; 106/54; 350/160 LC; 346/74 P
[51] Int. Cl.² ...................... H01B 3/00; G02B 5/23
[58] Field of Search ............ 252/63.2, 63.5; 106/54, 106/48; 380/160 LC; 346/74 P

[56] References Cited
OTHER PUBLICATIONS

Parmelee, Ceramic Glazes, pp. 270–274 and 283, Industrial Publications, (1951).

Shaw, Ceramic Glazes, pp. 56, 59, 86, 87, Elsevier Pub., (1971).

Van Hippel, Dielectric Materials & Appln's, (1954), (p. 310).

*Primary Examiner*—John D. Welsh
*Attorney, Agent, or Firm*—Roland Plottel

[57] ABSTRACT

A visual background layer for electro-optical display devices is provided having high dielectric quality and a black, deep matte surface based upon the black higher oxides of iron, cobalt, chromium and nickel in a film of high dielectric glass. A printing medium for such layers is provided which can be fired to form the layer in reducing atmospheres without reducing the oxides and deteriorating the dielectric quality.

6 Claims, No Drawings

DISPLAY DEVICE BACKGROUND COMPONENT COMPOSITION AND METHOD

FIELD OF THE INVENTION

This invention relates to electro-optical display devices and more particularly to background layers for such devices having high dielectric properties and a deep matte, black finish.

BACKGROUND OF THE INVENTION

Opto-electronic information display devices have come into use where the information is displayed by light sources which are actuated and controlled by electronic circuits. For optimum display, including ease of reading, it is desirable to provide a background for the light display which has a deep matte, black finish. Glossy backgrounds cause image reflections which confuse the image outlines when viewed at various angles. Such reflections also reduce the edge contrast between the image and the background. Colored backgrounds also reduce the contrast to the viewer or to photo recording devices.

It is also desirable for such background layers to have high dielectric qualities, as such backgrounds may be within the display envelope, may be in contact with the light source, or may serve as an integral component in the circuits of the display device itself. As the light sources are electrically energized, it is useful that the background layer, particularly when serving as a circuit component, have high dielectric properties. Further, as such backgrounds are commonly applied and used in thick film component circuitry, it is desirable that such background layers have an affinity for the substrates used and a compatibility with the other components used in the preparation of elements for such circuits by thick film techniques.

OBJECTS OF THE INVENTION

Thus, for use in display devices, it is useful that the background layer, in addition to its black, deep matte finish and high dielectric have a substantive affinity to the commonly used substrates and components, be easily applied, be capable of application by the commonly used thick film technology and not interfere with the development processes whereby the other components for elements of the circuits are applied and activated.

The layer of this invention should be capable of application as a printing ink or silk screen paste; it should be capable of being fired under the same conditions that the other components are fired and thus should not be deteriorated when subjected to elevated temperatures in inert or reducing atmospheres.

The layer of this invention should adhere to the substrates, such as Fosterite or $Al_2O_3$ which are commonly employed to support the printed circuits and should be able to provide localized dielectric qualities in areas where it is applied and to provide overall general insulation in areas where it covers or separates the layers of circuit components.

THE INVENTION

I have discovered a composition suitable for application as a printing medium and compatible for application by standard thick film techniques which will form a layer, that upon firing under the usual thick film temperatures and atmospheres, will yield a dielectric layer having a black, deep matte finish.

The composition of this invention, when prepared as described below and formulated into an ink or paste is suitable for deposition on substrates, in single or multilayers, by conventional printing techniques. The assembly of the substrate with its component layers including the single or multiple layers of this invention is then fired in a neutral or reducing atmosphere to provide the final component for the display device.

The composition of this invention may be used in other devices to form single or multilayered high dielectric elements. It may be used for this and other qualities in multi-layered semi-conductor and integrated circuit assembly packages, including "buried layer" conductor devices as well as for assemblies for plasma discharge displays, LED displays, solid phosphor displays of an electroluminescent character, and liquid crystal displays.

DETAILED DESCRIPTION OF THE INVENTION

The composition and my novel procedure for its preparation and use are as follows: (All amounts are by weight)

OXIDE STAIN MIX

An oxide stain mix is formulated from the following metals or their oxides in the stated proportions

| METAL | METAL OXIDE | WT/%* |
|---|---|---|
| Fe | $Fe_3O_4$ | 12 – 15 |
| Co | $Co_2O_3$ | 37 – 44 |
| Cr | $Cr_2O_3$ | 15 – 18 |
| Ni | $Ni_2O_3$ | 2 – 3 |
|  | $Ca.SiO_2$ | 8 – 18 |
|  | $Al_2O_3.SiO_2$ | 4 – 6 |
|  | $MgO.SiO_2$ | 2 – 4 |

*Calculated as the Oxide.

When the metals are used, the weight- percentages are adjusted to the proportions of the metal oxides.

For the iron oxide, a good purified grade of magnetite, $Fe_3O_4$ is preferred as it is cheaply available in purified form. The cobalt component is preferably used in the form of the black cobaltic oxide, $Co_2O_3$, but the "mixed" cobaltous-cobaltic oxide $Co_3O_4$ may be used. Green chromic oxide is the preferred source of chromium. Either of the nickel oxides may be used but the black sesqui-oxide or dried hydroxide is preferred as it is commercially available in pure form at low cost.

The calcia, alumina and magnesia silicas or silicates are those commonly used in the glass and ceramic industries.

It is preferred that the raw components of these mixtures be freed of conductive compounds and particularly from water-soluble ions.

After the components are mixed, the mixture is calcined in air for at least 3 hours and preferably up to 5 hours at temperatures in the range 1200° – 1350°C to the "bisque" state. Under these conditions the components are completely oxidized and there is some interreaction of the components with the formation of intermediate oxides.

After calcination, the resultant bisque is deagglomerated and washed. The initial deagglomeration may be by a rapid quench in water and is then followed by grinding to a fine powder.

This fine powder is then washed in successive portions of hot (80° – 95°C) deionized water until the conductivity of the spent wash water indicates substantially complete removal of water-soluble ionic impurities.

The washed powder is then dried to constant weight at 200° – 400°C. The dried material is then reground and bottled. It will herein below be referred to as the Oxide Stain Mix.

FRIT MIX

A glass frit mix is prepared from the following components:

| OXIDE | WT/% |
| --- | --- |
| $SiO_2$ | 53 – 65 |
| $B_2O_3$ | 25 – 33 |
| $Al_2O_3$ | 10 – 14 |

The materials are mixed and heated at temperatures from 800°C to 1200°C for from 2–4 hours. The smelt is then fritted by conventional methods and the frit is ball milled, preferably wet to a particle size of less than −325 mesh. The resultant product is then dried at 125°–150°C for 3–5 hours. This is referred to herein below as the Frit Mix.

PRINTING PIGMENT

A Printing Pigment is prepared from the components as follows:

|  | Wt/% |
| --- | --- |
| Frit Mix | 45±5 |
| Oxide Stain Mix | 20±3 |
| $Al_2O_3$ (Alumina) | 20±3 |
| $Ca.Al_2O_3SiO_2$ (Feldspar) | 15±2 |

The alumina is in the purified grade available as A-14 or its commercial equivalent; the feldspar is the washed Kona F-4 grade or its commercial equivalent.

The Frit Mix and the Oxide Stain components are mixed and calcined at 400°C for at least 1 hour but in the range 1–2 hours and then cooled and ball milled with the alumina and feldspar until the combined mixture has a particle size in the 5–20 micron range, preferably 7–9 microns. The milling preferably proceeds in an anhydrous purified nonionic vehicle such as isopropanol-MOS grade. After milling, the powder is dried at 110°–140°C for 5–8 hours.

This dried Printing Pigment mixture may be stored in dry, sealed containers but it is preferred to use the fresh material for the subsequent steps.

The Printing Pigment is deagglomerated by passing the dry powder through a high-speed mill such as a Petterson-Kelly mill fitted with an Intensifier-bar. While some minor size reduction is achieved by this mill, it primarily conditions the powder particles for easier incorporation into the vehicle.

VEHICLE

A Printing Paste vehicle is prepared consisting of:

|  | Wt/% |
| --- | --- |
| Terpineol | 95–97 |
| Ethyl Cellulose | 3–5 |

The mixture is heated and stirred until homogenous. The Vehicle should have a viscosity of 26–28 K cps at 26°C.

While a specific vehicle is denominated above, it is merely representative of solvents and adhesives for preparing vehicles suitable for use in thick film printing technology. The proportions set forth for this vehicle are suitable to prepare a vehicle of the viscosity set forth which I have found to be most useful for preparing printing media for the films of this invention by the silk-screen method. Other vehicles, formulations and components and other viscosities may be used for other printing techniques such as by intaglio, photo resist and offset printing. The vehicle and the activated pigment are blended and sheared by conventional technics until a homogeneous printing medium is prepared.

PRINTING MEDIUM

The quantities of pigment and vehicle are adjusted to provide pastes, inks and other printing media suitable to the specific method. As with all such methods the viscosity of the medium is the important factor controlling the thickness of the film to be achieved by the specific printing method. To prepare a printing paste suitable for the silk screen process the activated Printing Pigment is ground into the vehicle in a 3-roll ink and pigment roller mill. The pigment is added until the resultant paste has a viscosity of 275±25K cps at 26°C as measured on a Brookfield viscosimeter (Model RTV) using a TC spindle at 2.5 r.p.m. The proportion of pigment to vehicle is approximately 70%:30%.

The resultant printing paste provides excellent images when applied by conventional silk screen printing methods to the usual substrates such as Fosterite, with or without circuits and circuit components printed thereon. The images are clear with a minimum of capillarity at the edges. The printed surface has good leveling, providing films of uniform thickness and thus uniform dielectric of the final layer.

After the silk screen printing operation, the substrates with the printed layers thereon are air dried at temperatures in the range 75°–275°C. The dried substrates are then fired at from 900°C to 1000°C in a neutral or reducing atmosphere as is usually required for finally melting, smelting, sintering, and reducing of the components of such thick film component preparation techniques to prepare the final device or element.

The atmosphere for such final firing is usually an inert or preferably a reducing atmosphere. Among inert atmospheres, nitrogen or one of the rare gases are used, with argon being preferred. Among the reducing gases, hydrogen, wet or dry, and gaseous $NH_3$ or its catalytically dissociated mixture are commonly and interchangeably used.

Surprisingly, despite the high metallic oxide content of the Stain mixture, the calcining and smelting of the Stain and Frit Mixes, each prior to their combination and low temperature (400°C) calcination appears to have prevented the reduction to the metal of any of the oxides in the Stain. This is apparent from the high dielectric qualities of the final product. Such qualities would be lost if there were any metal present. When either the precalcination of the Stain mixture or the smelting of the Frit Mix is omitted, the dielectric qualities of the final fired films is greatly deteriorated. Such films of deteriorated dielectric are marginal or insufficient for proper use as dielectric components.

Also when the precalcination of the Stain is omitted, the "black intensity" of the fired films is decreased (by black-body radiation measurements). The reflectance is also increased and consequently the depth of the matte finish is reduced. The significant loss of these properties compromises such materials for use as background elements for display devices.

The invention has been described by its preferred embodiments and all materials except where indicated specifically as critical, are exemplary. Similarly the preferred procedures have been detailed. However all art-recognized equivalent materials and procedures may be substituted in the non-critical areas of the invention.

I claim:

1. A visual background layer for use in electro-optic display devices, said visual background layer having high dielectric qualities and a black, deep matte surface comprising the calcined mixture of the black higher oxides of iron, cobalt, chromium, and nickel incorporated into a film of dielectric glass.

2. A process of manufacturing a black, deep matte, medium having high dielectric qualities, comprising the steps of:
   A. forming an oxide stain mix by
      1. combining the following metals or their oxides in the stated proportions

| Metal | Metal Oxide | WT/%* |
|---|---|---|
| Fe | $Fe_3O_4$ | 12–15 |
| Co | $Co_2O_3$ | 37–44 |
| Cr | $Cr_2O_3$ | 15–18 |
| Ni | $Ni_2O_3$ | 2–3 | together with the following silicates in the stated proportions

| Silicates | WT/% |
|---|---|
| $Ca.SiO_2$ | 8–18 |
| $Al_2O_3.SiO_2$ | 4–6 |
| $MgO.SiO_2$ | 2–4 |

*= calculated as the oxide 2. calcining in air the mixture recited in step (A)(1), above, for from 3 to 5 hours in the temperature range 1200° – 1350°C until the "bisque" state is attained;
   3. deagglomerating the calcined mixture;
   4. washing the deagglomerated mixture in hot, di-ionized water to remove substantially all water-soluble ionic impurities;
   5. drying the washed mixture to remove said deionized water; and then
   6. grinding the dried mixture to a fine powder;
   B. forming a fritted glass mixture by
      1. combining the following components in the stated proportions

| Oxide | WT/% |
|---|---|
| $SiO_2$ | 53–65 |
| $B_2O_3$ | 25–33 |
| $Al_2O_3$ | 10–14 |

2. smelting the combined components recited in step (B)(1), above, for from 2 to 4 hours at a temperature of from 800° – 1200°C;
   3. fritting the smelted glass thus produced;
   4. ball-milling the fritted smelt to a particle size of less than −325 mesh; and then
   5. drying the milled frit for from 3 to 5 hours at a temperature of from 125° – 150°C;
   C. forming a pigment by
      1. combining the oxide stain mix produced in step (A), above, with the fritted glass mixture produced in step (B), above, in the stated proportions

| Element | WT/% |
|---|---|
| fritted glass mixture | 45±5 |
| oxide stain mix | 20±3 |

2. calcining the mixture obtained in step (C)(1), above, for from 1 to 2 hours at a temperature of about 400°C;
   3. ball-milling the calcined mixture in an anhydrous purified, non-ionic vehicle with alumina and feldspar, according to the following proportions, until the combined mixture has a particle size of from 5 to 20 microns, preferably 7 to 9 microns

| Element | WT/% |
|---|---|
| $Al_2O_3$ (Alumina) | 20±3 |
| $Ca.Al_2O_3SiO_2$ (Feldspar) | 15±2; and then |

4. drying the milled mixture for from 5 to 8 hours at a temperature of from 5 to 8 hours; and
   D.
      1. grinding the pigment set forth in step (C), above, into some suitable vehicle thereby to form the desired black, deep matte, medium.

3. A black, deep matte, medium produced according to the process described in claim 2.

4. The process according to claim 2 including the further steps of:
   E.
      1. prior to step (D)(1), deagglomerating the dried, milled mixture of step (C)(4); and
   F. forming said vehicle by
      1. combining the following elements in the stated proportions

| Element | WT/% |
|---|---|
| Terpineal | 95–97 |
| Ethyl Cellulose | 3–5; and |

2. heating and stirring the above mixture until it homogenous and has a viscosity of from 26 to 28K cps at a temperature of 26°C.

5. A process for forming an oxide stain mix for use in a black, deep matte, medium having high dielectric qualities, comprising the steps of:
   A. combining the following metals or their oxides in the stated proportions

| Metal | Metal Oxides | WT/%* |
|---|---|---|
| Fe | $Fe_3O_4$ | 12–15 |

-continued

| Metal | Metal Oxides | WT/%* |
|---|---|---|
| Co | $Co_2O_3$ | 37–44 |
| Cr | $Cr_2O_3$ | 15–18 |
| Ni | $Ni_2O_3$ | 2–3 |

*calculated as the oxide together with the following silicates in the stated proportions

| Silicates | WT/% |
|---|---|
| $Ca.SiO_2$ | 8–18 |
| $Al_2O_3.SiO_2$ | 4–6 |
| $MgO.SiO_2$ | 2–4 |

B. calcining in air the mixture recited in step (A), above, for from 3 to 5 hours in the temperature range 1200° – 1350°C until the "bisque" state is attained;

C. deagglomerating the calcined mixture;

D. washing the deagglomerated mixture in hot, de-ionized water to remove substantially all water-soluble ionic impurities;

E. drying the washed mixture to remove said de-ionized water; and then

F. grinding the dried mixture to a fine powder.

6. A process for forming a fritted glass mixture for use in a black, deep matte, printing medium which comprises the steps of A. combining the following components in the stated proportions

| Oxide | WT/% |
|---|---|
| $SiO_2$ | 53–65 |
| $B_2O_3$ | 25–33 |
| $Al_2O_3$ | 10–14 |

B. smelting the combined components recited in step (A), above, for from 2 to 4 hours at a temperature of from 800° – 1200°C;

C. fritting the smelted glass thus produced;

D. ball-milling the fritted smelt to a particle size of less than −325 mesh; and then E. drying the milled frit for from 3 to 5 hours at a temperature of from 125° – 150°C.

* * * * *